F. A. COLE.
MOVING PICTURE MACHINE.
APPLICATION FILED FEB. 1, 1910.
1,024,975.
Patented Apr. 30, 1912.
3 SHEETS—SHEET 1.
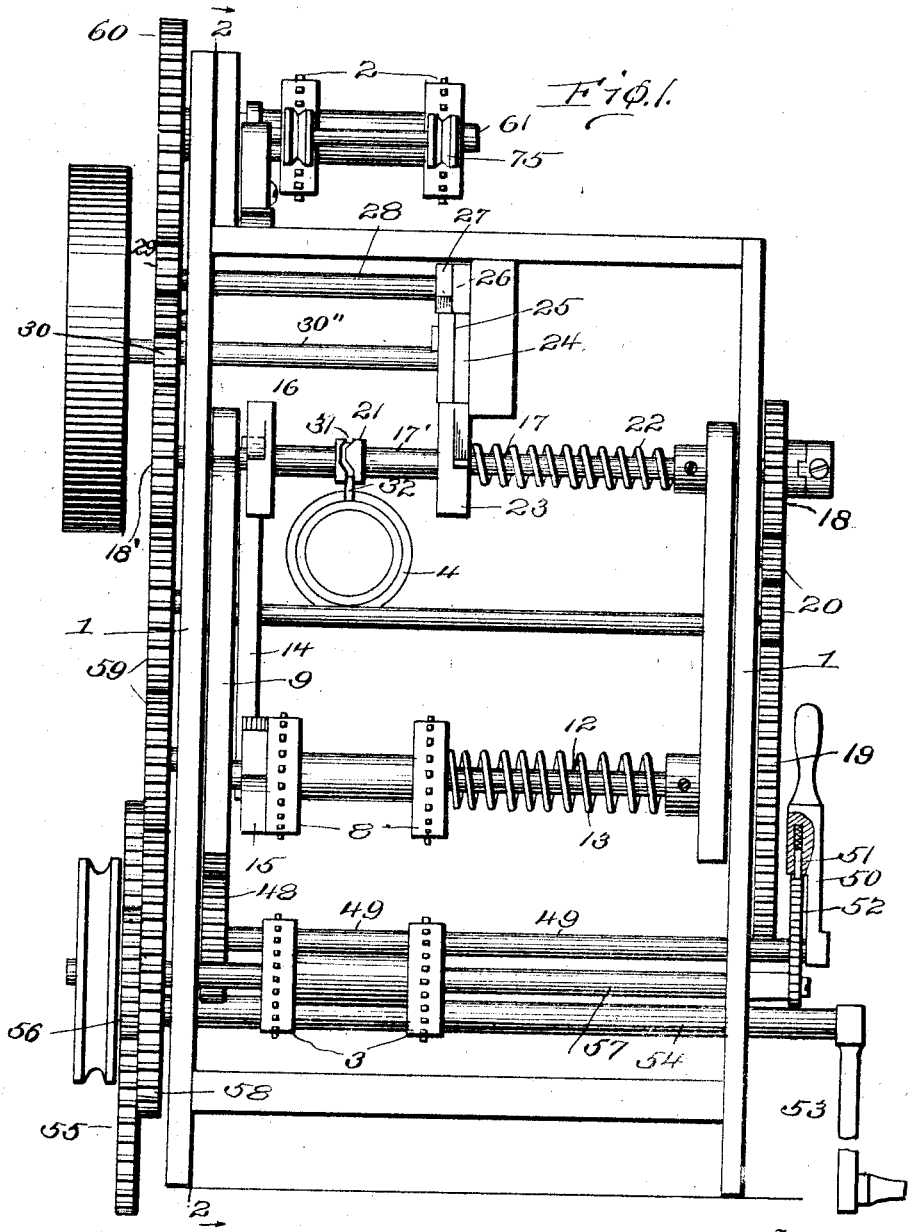

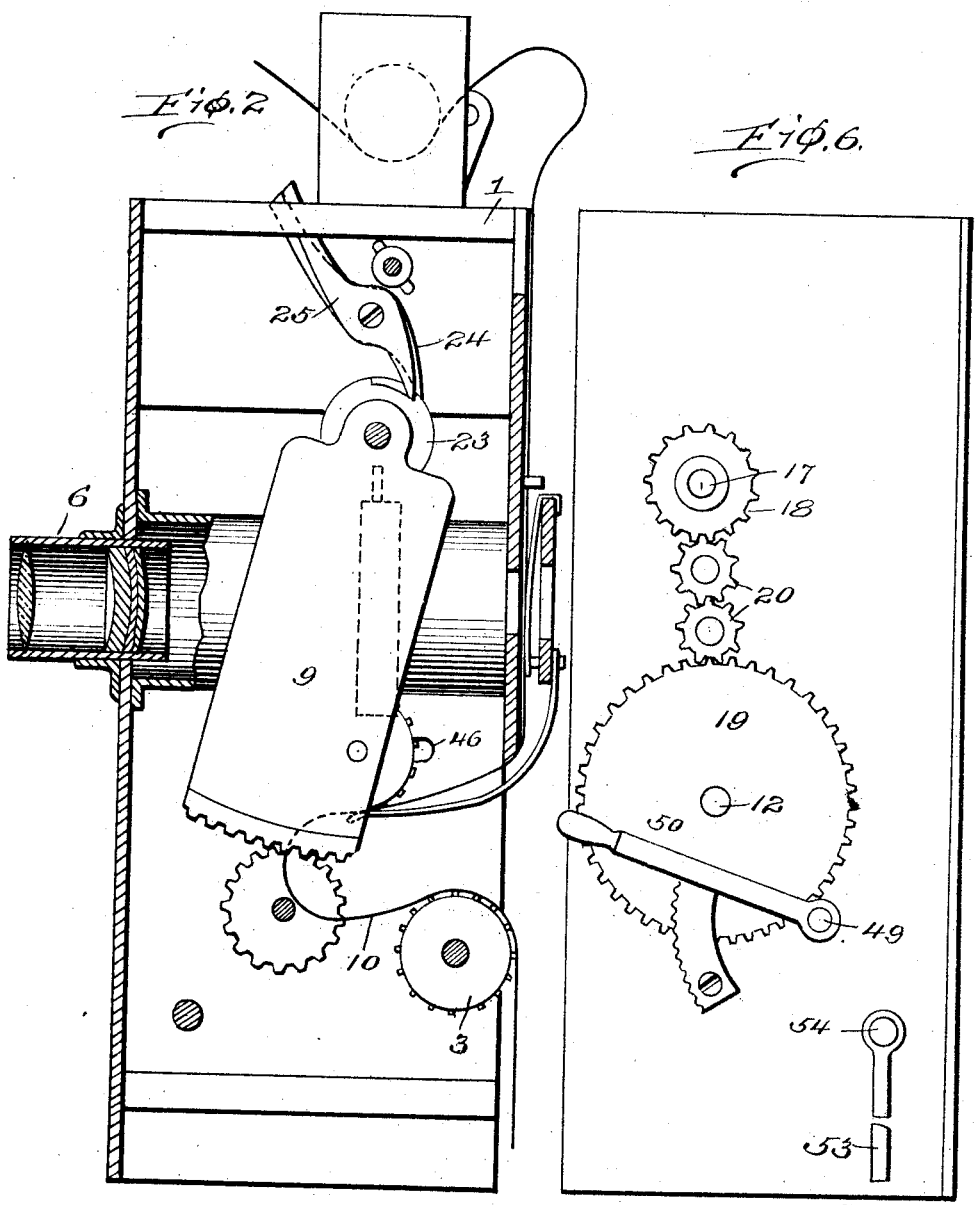

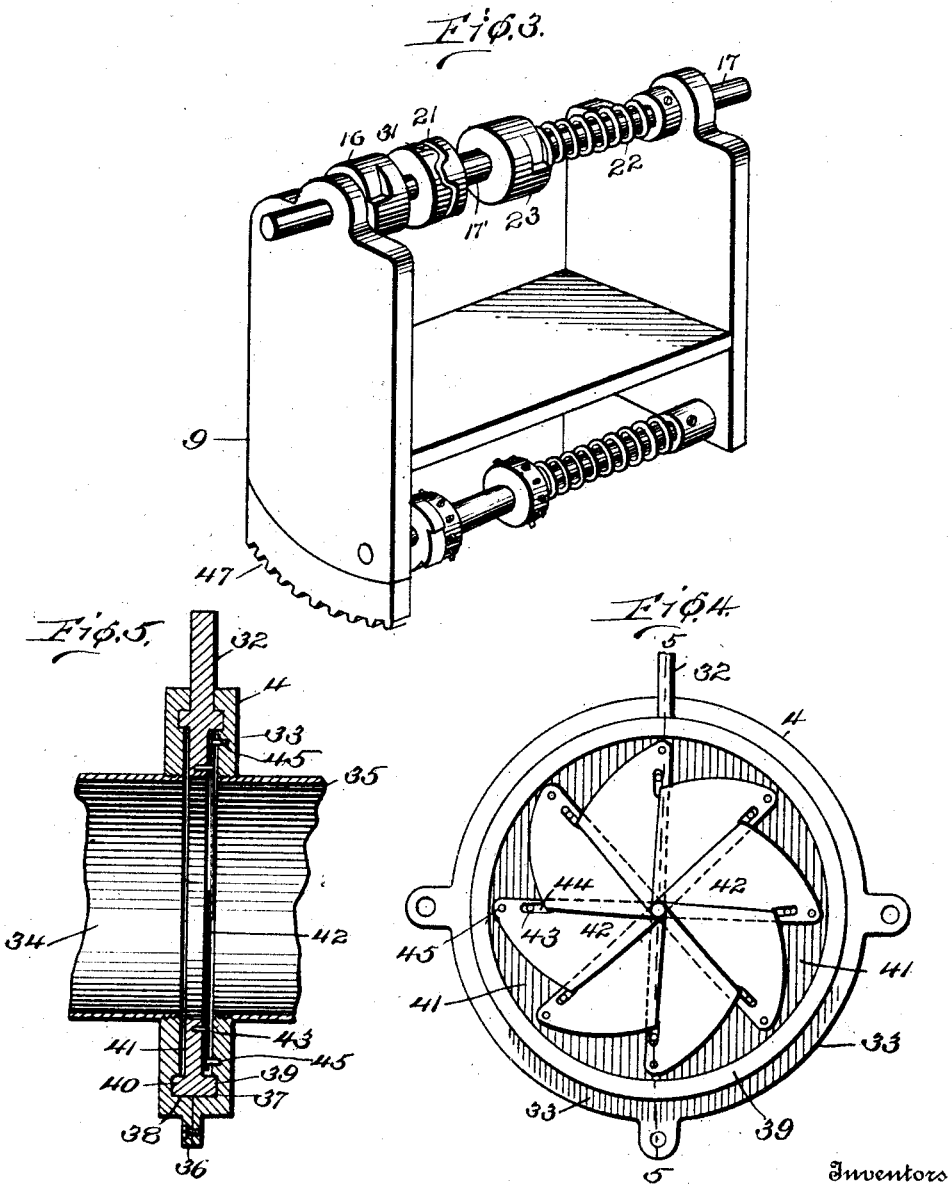

UNITED STATES PATENT OFFICE.

FRANK A. COLE, OF PATTON, PENNSYLVANIA.

MOVING-PICTURE MACHINE.

1,024,975.  Specification of Letters Patent. Patented Apr. 30, 1912.

Application filed February 1, 1910. Serial No. 541,331.

*To all whom it may concern:*

Be it known that I, FRANK A. COLE, a citizen of the United States, residing at Patton, in the county of Cambria and State of Pennsylvania, have invented certain new and useful Improvements in Moving-Picture Machines; and I do hereby declare the following to be a full, clear, and exact description of the invention, such as will enable others skilled in the art to which it appertains to make and use the same.

This invention relates to improvements in moving picture machines, and particularly to improved means for shutting off the beam of light passing through the machine during the movement of the film.

One of the objects of the invention is the arrangement of a shutter mechanism, and means for operating the same so as to effect the adjustment in such a manner as to present a substantially continuous beam of light, and at the same time to cause a film to be properly exposed.

Another object of the invention is the arrangement of a shutter mechanism and cam for operating the same which will move the shutter to an open or closed position as determined by the shape of the cam for permitting the passage of light through the machine for the desired time, and then shutting off the light during the movement of the film so that no light will be thrown on the canvas during the moving of the film, and no blurring will be the result.

With these and other objects in view the invention comprises certain novel constructions, combinations and arrangement of parts as will be hereinafter fully described and claimed.

In the accompanying drawings: Figure 1 is an elevation of the machine looking from the front with the front plate removed. Fig. 2 is a longitudinal vertical section through the machine shown in Fig. 1 on line 2—2. Fig. 3 is a detail perspective view of a swinging film adjuster. Fig. 4 is a front view of a shutter embodying certain features of the invention. Fig. 5 is a section through Fig. 4, approximately on line 5—5. Fig. 6 is a side elevation of the machine, certain parts being removed.

In the construction of moving picture machines or kinetoscopes it is aimed to so rapidly move a film across a beam of light as to give what appears to be a continuous picture on the canvas. In moving the film across the beam of light the beam of light must be shut off during the movement of the film and permitted to be projected upon the canvas only while the film is stationary, so as to eliminate flickering or flashing, and to give a steady picture. The aim in constructing machines of this character is to expose the film as long as possible to the beam of light. In arranging means for permitting the beam of light to expose the picture for a longer time than the picture is hidden from view an improved shutter is arranged in the path of the beam of light and operated by means connected with the film feeding rolls for properly timing the shutting off of the light. A plurality of spring operated cams and associated parts are connected with the means for shifting the shutter so that the same will automatically be shifted in proper timed relation to the movement of the film for causing the beam of light to remain longer on the canvas and make the period of darkness less.

In order that the invention may be more fully understood reference is had to the accompanying drawings, in which 1 indicates a framework of any desired kind, upon which the various parts of the device are mounted. The various film feeding means and operating parts thereof, together with frame 1, are fully disclosed and claimed in my former Patent, #947,093, issued January 18, 1910, and are shown in this application simply for disclosing how the shutter mechanism and the film adjusting mechanism operate and the combination of the same with a moving picture mechanism. However, in order to make the matter more clear it will be observed that there are mounted at the upper end of framework 1 a pair of rollers 2 and at the lower end a pair of rollers 3. Rollers 2 and 3 are both provided with teeth or spurs for engaging the apertures in the side of the film for guiding and feeding the film through the machine, roller 2 being arranged to supply the film or feed the same into the machine, and roller 3 being designed to pull or move the film from the machine. Mounted near rollers 2 are rollers 75 designed to keep the film in engagement with the spurs or teeth. Rollers 2 and rollers 3 are designed to be continuously moving as long as the machine is in operation, but the film moves intermittently past the shutter 4 which is in alinement with the lens 6. The lens 6 and associated parts are of any desired or preferred structure, and will therefore need no further description.

The intermittent movement of the film is caused by the feeding rollers 8 mounted upon swinging frame 9. These feeding rollers draw the film past the beam of light which is projected through shutter 4 when the same is open, and do so intermittently while the feeding rollers 3 continuously feed the film from the loop 10. During the period in which the picture is being projected through the lens the film is stationary, but rollers 2 and 3 are continuously moving. As roller 2 continues to move and yet the film in front of lens 6 is stationary the film is bulged or bowed out and forms a loop which permits or presents ample film for permitting the sudden or quick movement of roller 8 to draw another picture in front of lens 6. As roller 8 is given an intermittent movement and quickly feeds film along the loop 10 is necessary as roller 3 is continuous in its movement. In this manner as roller 3 moves loop 10 will be reduced in size until a quick movement of roller 8 will cause additional film to be forced past roller 8 and the loop 10 enlarged. This action is continued as long as the machine is in operation. The loop at the top of the machine is designed to permit the sudden movement of the film past the lens 6 and to supply a proper amount of loose film at all times. From this it will be observed that the film is continuously and evenly fed into the machine and removed from the machine, but is intermittently moved past the lens 6. During the time in which the rollers 8 are stationary the film in front of lens 6 is stationary, and consequently a light passing therethrough will project a picture upon the canvas, shutter 4 being also open at this time. Roller 8 is loosely mounted upon shaft 12 and is arranged to be moved or rotated by a spring 13 fastened to the hub of roller 8 and if desired may be passed entirely therethrough and bent over or clenched so as to prevent any accidental removal thereof. Spring 13 surrounds part of shaft 12 and engages at the end opposite rollers 8 the shaft 12 and is connected therewith in any desired manner so that whenever shaft 12 is rotated the spring will be wound or brought under tension for moving rollers 8 when the same are released from the double acting lever 14. One of the rollers 8 is provided with an extension 15 having a plurality of cams thereon for engagement by lever 14 which is pivotally mounted on the swinging frame 9. The opposite end of lever 14 engages a cam wheel 16 rigidly connected to sleeve 17'. Shaft 17 carries a gear wheel 18 and receives motion from gear wheel 19 connected with shaft 12 through idlers 20. The cams arranged on wheel 16 are arranged to move lever 9 so as to release the cams on extension 15 for permitting the spring 13 to rotate rollers 8 at the time that cam 21 closes shutter 4.

The cams on wheel 16 are so arranged as to permit the partial rotation of the wheel before lever 9 is again operated for releasing rollers 8 so that as cam 21 rotates the shutter 4 will be opened immediately after the film has stopped moving, and will remain open until rollers 8 begin to move again, whereupon the shutter will be again closed. This action will be maintained in this relation during the entire movement of the machine. The gear wheel 18 connected with shaft 17 communicates power to spring 22 which is connected at one end to shaft 17. Spring 22 is connected at the opposite end to a roller 23 which is rigidly secured to a sleeve 17' mounted on shaft 17 and carrying cams 21 and wheel 16. This will cause power to be conveyed to the film and shutter through springs 13 and 22, so as to give a quick movement thereto. Wheel 23 is provided with a plurality of stops engaged by levers 24 and 25 operated by stops 26 and 27 rigidly secured to a continuously rotating shaft 28. Shaft 28 has connected therewith a gear wheel 29 which receives power from gear wheel 18' through idlers 30. By this arrangement whenever shaft 28 has made a complete revolution stop 27 will be rotated for engaging lever 25 which will raise the lever or disengage the same from the stop that is engaged thereby formed on wheel 23 for permitting a quick rotary movement of the wheel 23 and sleeve 17', together with the parts connected therewith under the action of spring 22. Only a partial revolution is made as lever 24 engages a stop after the wheel 23 has moved a predetermined distance. After a predetermined time has elapsed stop 26 will engage lever 24 and disengage the same from wheel 23 so as to permit another partial revolution of wheel 23 which continues its rotary movement until lever 25 has again engaged a stop provided therefor on wheel 23.

During the operation of the machine shaft 17 is continuously moving but sleeve 17' is moved intermittently under the action of spring 22 so that wheel 16 will move intermittently and intermittently operate lever 14 which releases at intervals rollers 8. The action of these various parts is designed to intermittently move the film past shutter 4 and shutter 4 is connected with these parts through cam 21 for causing the same to act in proper relation thereto. Cam 21 is formed with a cam groove therein with offset portions 31 which are comparatively short in length so that the movement of the shutter operating lever 32 will be very quick. When the sleeve 17' rotates for eventually setting in motion the film, cam 21 moves and lever 32 is forced into one of the offset portions 31 and remains in that portion during the movement of the film and immediately moves out of said offset portion at the termination of the movement of the film. This movement is so quick as to appear to the eye to be a continuous movement in and out, though, of course, there is a slight pause in the movement of the shutter by the fact that the offset portion 31 is slightly elongated. This pause is sufficient for permitting the complete movement of the film.

The shutter 4 is more clearly shown in Figs. 4 and 5 to which especial attention is now directed. The shutter 4 is provided with a frame or housing 33 preferably secured to tubes 34 and 35 which are connected with the frame work 1 in any desired manner. The frame or housing 33 is preferably made in two parts and secured together by any desired means, as for instance screws 36. The respective parts of housing 33 are formed with grooves 37 and 38 which accommodate annular beads or ridges 39 and 40 formed on ring 41. Projecting from ring 41 is operating lever 32 which fits into the cam groove of cam 21 and is moved back and forth thereby for oscillating ring 41. This oscillatory movement is conveyed to any desired number of shutters 42 through pins 43. Pins 43 pass through suitable slots 44 which permit the desired movement of the shutters which are pivotally mounted at 45 to the housing 33. In mounting the shutters 42 the same are preferably arranged to slightly overlap in order to positively prevent the passage of any light when the shutters are closed. The pivotal member 45 and pin 43 are set at a sufficient distance apart for permitting the oscillatory movement of ring 41 caused by cam 21 to fully open the respective shutters and fully close the same. If it is desired at any time to cause the shutters to remain open longer or shorter all that is necessary is to change cam 21 so that the offset portion 31 will have a shorter or longer portion for the travel of lever 32 as the shutter is closed during the movement of lever 32 through the offset portion 31.

Pivotally mounted upon shaft 17 is a swinging frame 9 which may be called a film adjuster. Frame 9 is preferably constructed of comparatively heavy material so as to be freely operated and to properly stand all strains thereon in any position in which it may be moved. The frame 9 carries shaft 12 upon which rollers 8 and surrounding parts are mounted. The shaft 12 is journaled in the side members of frame 9 but has one end thereof extending through one side of frame 1 to which is rigidly secured gear wheel 19 to which power is transmitted from shaft 17 through gear 18, idlers 20, and associated parts. A slot 46 (Fig. 2) is provided in the side of framework 1 for permitting the swinging movement of frame 9. In order to provide means readily accessible for quickly adjusting frame 9 at any desired time a rack 47 is rigidly secured to one end of frame 9 and meshes with the gear wheel 48 carried by shaft 49. Shaft 49 is journaled in framework 1 and extends through the side of the framework 1 in which the slot 46 is formed and has connected therewith at the outer end an adjusting arm 50. To arm 50 is connected a spring pressed catch 51 which engages segment or rack 52 whereby the lever is locked in any of its adjusted positions.

In operation power is applied to crank 53 which is rigidly secured to shaft 54 that is journaled in framework 1 and extends entirely through the framework. On the opposite end to crank 53 is provided a gear wheel 55 which meshes with a gear wheel 56 rigidly secured to shaft 57 which carries rollers 3. By these means power is conveyed to rollers 3 for continuously operating the same during the operation of the machine. Rigidly connected with shaft 57 is a second gear wheel 58 which conveys power to gear wheel 18' through idlers 59. Gear wheel 18 is rigidly secured to shaft 17 for conveying power thereto from which power is supplied to spring 22 for operating wheel 23 and surrounding parts, and also for conveying power to gear wheel 18' and associated parts. In this manner power is conveyed to the intermittent rollers 8 and to the intermittent wheels 23 and 16 and to cam 21, whereby shutter 4 is operated in proper timed relationship to the movement of the film, and rollers 8 are released at the proper time for permitting spring 13 to move the film, while the shutter 4 is closed. Gear wheel 18' transmits power from shaft 17 to gear wheel 29, through suitable idlers 30. Gear wheel 29 is rigidly secured to shaft 28 so that when the same is rotated the members carrying lugs 26 and 27 will be rotated for operating levers 24 and 25 in proper timed relationship to the operation of the remaining parts of the mechanism. In fact the movement of lugs 26 and 27 releases operating levers 24 and 25, and thereby determines the time of operation and movement of all of the intermittent moving parts of the device. The gear wheel 30 carries a shaft 30'' to which is secured a fly wheel for giving a more even movement to the entire machine. Gear wheel 29 meshes with a gear wheel 60 which is secured to shaft 61. Shaft 61 carries the rollers 2 which are rigidly secured thereto so that whenever gear wheel 60 rotates the rollers 2 will also rotate at the same speed. From this it will be observed that the various moving parts of the device are provided with power from a single source, and are arranged to operate in a proper manner and in a proper direction for accomplishing the various objects of the invention, and for acting in unison so that each part will perform the duties thereof at the right time.

After the film has been threaded through the machine and over the respective rollers 2, 8 and 3 the machine is ready for use. Of course, any desired kind of light may be used for projecting a beam of light through the shutter when open, and through the lens, together with the film. After the machine is in this condition the crank 53 may be rotated at any desired speed and by the particular construction and arrangement set forth the speed may be comparatively slow and yet no flickering of the light will result as the light is shut off a very short time in comparison to the time the light is permitted to be projected on the canvas. Of course, the speed may be increased or decreased at will, regulated by the speed of the crank 53.

What I claim is:

1. The combination with a moving picture machine arranged with means for passing a film therethrough, and causing the movement of the film to be intermittent, of a shutter operating cam, a sleeve for operating said cam, a spring for rotating said sleeve, means for connecting said spring with the means for moving said film, a shutter, means operated by said cam associated with said shutter for opening and closing said shutter, and means for causing an intermittent movement of said sleeve in timed relationship to the intermittent movement of the film for causing the shutter to close during the movement of the film.

2. The combination with a moving picture machine arranged with means for passing a film therethrough, of a shutter designed to close during the movement of said film, an arm for opening and closing said shutter, a cam for moving said arm, a sleeve for rotating said cam, a spring connected at one end to said sleeve, a gear wheel connected with the end of said spring not connected to said sleeve, means for transmitting power to said gear wheel from the means operating said film, and means for causing an intermittent movement of said sleeve in timed relationship to the intermittent movement of the film, whereby the shutter is closed while the film is moving.

In testimony whereof I affix my signature in presence of two witnesses.

FRANK A. COLE.

Witnesses:
 JOHN L. FLETCHER,
 A. L. KITCHIN.